(12) United States Patent
Chandler et al.

(10) Patent No.: US 12,425,112 B2
(45) Date of Patent: Sep. 23, 2025

(54) SIGNAL POWER VALIDATOR

(71) Applicants: Rand C. Chandler, Virginia Beach, VA (US); Aiden J. Cowhig, Arlington, VA (US); Robert N. Iannuzzi, Virginia Beach, VA (US); Joseph A. Moder, Virginia Beach, VA (US); Michael William Patrick O'Brien, Moyock, NC (US); Christine M. Gausin, Herndon, VA (US); Adam David Daniels, Virginia Beach, VA (US); Loi Nguyen, Hampton, VA (US)

(72) Inventors: Rand C. Chandler, Virginia Beach, VA (US); Aiden J. Cowhig, Arlington, VA (US); Robert N. Iannuzzi, Virginia Beach, VA (US); Joseph A. Moder, Virginia Beach, VA (US); Michael William Patrick O'Brien, Moyock, NC (US); Christine M. Gausin, Herndon, VA (US); Adam David Daniels, Virginia Beach, VA (US); Loi Nguyen, Hampton, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 338 days.

(21) Appl. No.: 18/200,815

(22) Filed: May 23, 2023

(65) Prior Publication Data

US 2024/0396641 A1   Nov. 28, 2024

(51) Int. Cl.
*H04B 17/00*   (2015.01)

(52) U.S. Cl.
CPC .............................. *H04B 17/0085* (2013.01)

(58) Field of Classification Search
CPC .. H04B 17/0085; H04B 17/104; H04B 17/14; H04B 17/15; H04B 17/17; H04B 17/18; H04B 17/20; H04B 17/00; H04B 17/10
See application file for complete search history.

(56) References Cited

U.S. PATENT DOCUMENTS

| | | | |
|---|---|---|---|
| 2002/0021601 A1* | 2/2002 | Chornenky | G07C 9/00182 365/200 |
| 2007/0013547 A1* | 1/2007 | Boaz | H04Q 9/00 340/870.02 |
| 2022/0271798 A1* | 8/2022 | Wobak | H04B 5/79 |

* cited by examiner

*Primary Examiner* — John J Lee
(74) *Attorney, Agent, or Firm* — Gerhard W. Thielman

(57) ABSTRACT

A radio frequency (RF) validator instrument is provided for testing functionality of a test article. The instrument includes an RF transmitter, a connection apparatus, an RF receiver, a direct current (DC) bias detector, and an RF verifier. The transmitter produces an emission signal supplied to an in-port and an out-port. The apparatus connects the in-port and the out-port to separate terminals of the article. The receiver receives said emission signal and producing a detection signal. The DC bias detector receives the emission signal through the out-port to a first voltage divider as a first bias signal, through the in-port to a second voltage divider as a second bias signal, and combining the first and second bias signals as a combination bias signal. The verifier compares the detection and combination bias signals to determine whether the article satisfies functionality.

7 Claims, 1 Drawing Sheet

SIGNAL POWER VALIDATOR

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to test processes for electrical components related to radio frequency (RF) communication. In particular, the invention relates to convenient RF component testing.

Wireless communication includes emission and reception of radio frequency (RF) signals. Operational RF bands range from about 20 kHz to about 300 MHz. Portable radios for such RF communication employ energy storage devices, such as direct current (DC) batteries to provide electrical power necessary for such operations.

SUMMARY

Conventional communication device evaluation yields disadvantages addressed by various exemplary embodiments of the present invention. In particular, various exemplary embodiments provide a radio frequency (RF) validator instrument for testing functionality of a test article. The instrument includes an RF transmitter, a connection apparatus, an RF receiver, a direct current (DC) bias detector, and an RF verifier. The transmitter produces an emission signal supplied to an in-port and an out-port. The apparatus connects the in-port and the out-port to separate terminals of the article.

The receiver receives said emission signal and producing a detection signal. The DC bias detector receives the emission signal through the out-port to a first voltage divider as a first bias signal, through the in-port to a second voltage divider as a second bias signal, and combining the first and second bias signals as a combination bias signal. The verifier compares the detection and combination bias signals to determine whether the article satisfies functionality.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith.

General purpose machines include devices that execute instruction code. A hardwired device may constitute an application specific integrated circuit (ASIC), a field programmable gate array (FPGA), digital signal processor (DSP) or other related components. Responsive indicator illumination can be provided by a light emitting diode (LED). The disclosure generally employs quantity units with the following abbreviations: electric potential in volts (V), energy in joules (J) and frequencies in kilohertz (kHz) and gigahertz (GHz). Supplemental measures can be derived from these.

Figure 1:
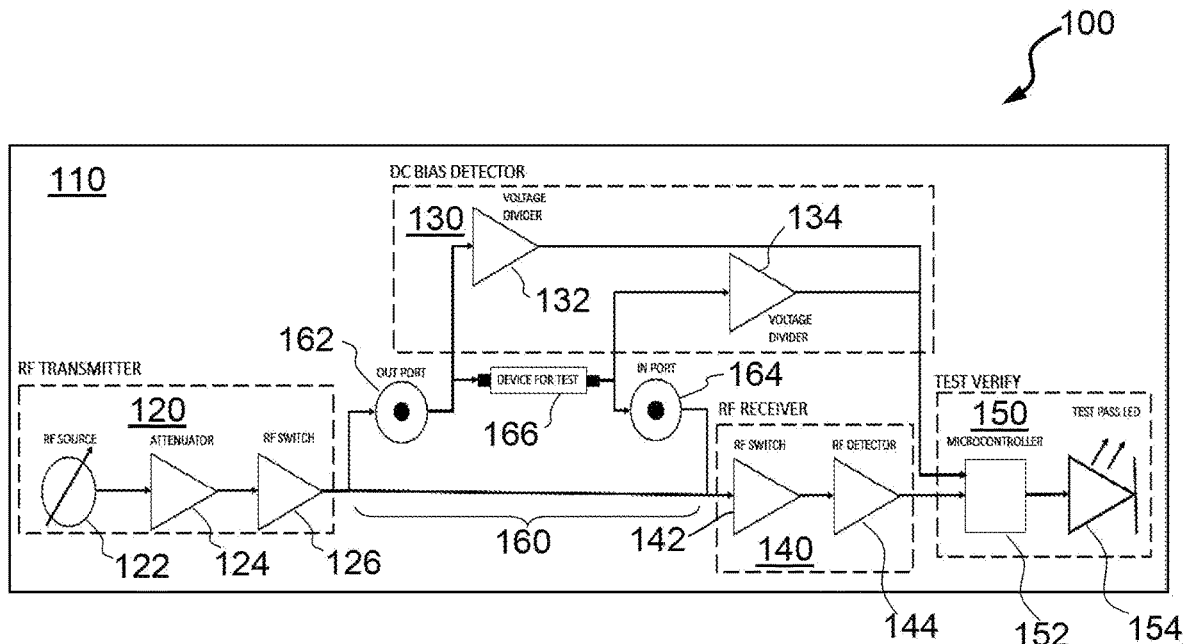
FIG. 1 is a hardware block diagram view of a radio frequency validator (RFV)

FIG. 1 shows a hardware block diagram view 100 of an exemplary RF validator (RFV) 110 as a test system. A transmitter 120 includes an RF source 122, an RF attenuator 124 and an RF switch 126. A bias detector set 130 includes an output voltage divider 132 and an input voltage divider 134. A receiver 140 includes an RF switch 142 and an RF detector 144. A test verifier 150 includes a microcontroller 152 and a test diode 154. A test apparatus 160 includes an out-port 162, an in-port 164 connected at separate terminals to a test article 166. The RF source 122 includes or receives energy from a DC power source, such as a battery. The controller 152 can be a general purpose processor or ASIC or FPGA or DSP, etc.

The internal design of the RFV 110 includes an RF source 122 to generate a known test signal for testing various RF components for a forward deployed environment, such as cables, low noise amplifier (LNA), or any other basic RF items evaluated as an article 166. The RF source 122 produces an initial signal that the attenuator 124 modulates and the switch 126 shapes as a test signal received by the out port 162 and the switch 142.

The out port 162 feeds the test signal to the article 166 and the voltage divider 132. The article 166 submits a test signal to the in port 164 and the voltage divider 134. The in port 164 feeds its port signal to the switch 142 together with the test signal. The switch 142 forwards its switching signal to the detector 144, which outputs a detector signal to the controller 152. Both voltage dividers 132 and 134 also feed their combined signals to the controller 152, which compares the detector and combined signals to determine whether their voltages differ within that article's established threshold.

If so, the article 166 passes the test. Otherwise, the article 166 fails, resulting from excessive resistance, otherwise faulty circuitry or power loss due to decrease in current, such as in a battery. In response to signal comparison by the controller 152, the diode 154 indicates whether the article 166 passes or fails the test. The signal direct to bias detector 130 and/or between switches 126 and 142 enables by pass of the article 166. This enables the RF signal integrity and/or DC bias of RF propagating devices and cables to be verified as articles 166 in test.

Figure 2:
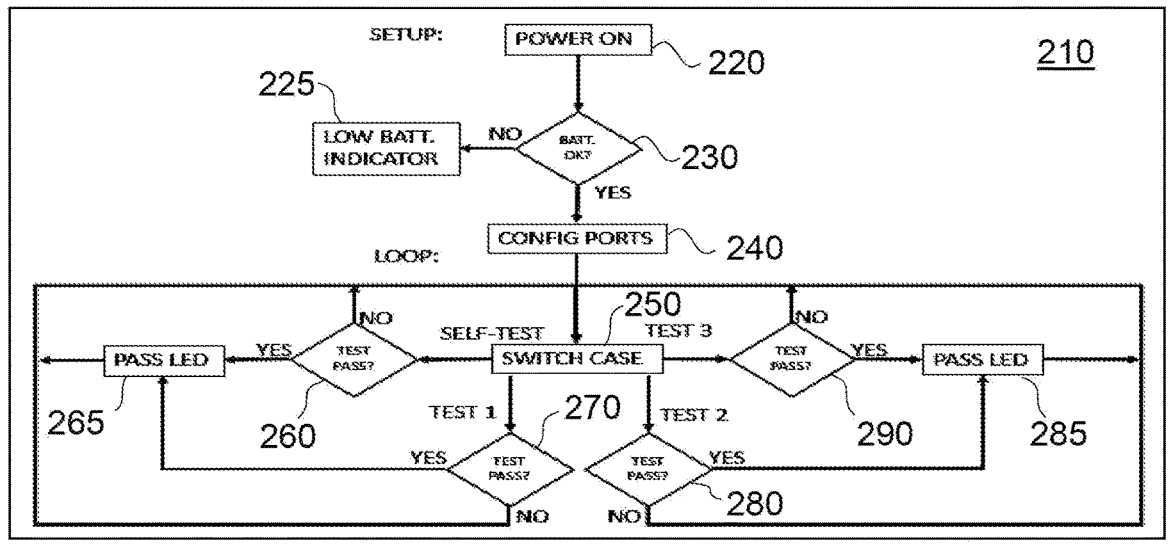
FIG. 2 is a firmware block diagram view of an RFV test regimen.

FIG. 2 shows a logical block diagram view 200 of the test system 110, describing instructions for test modes and parameter verification as firmware. A power switch 220 initiates with activation for setup mode. This signals a logical query 230 for whether the battery is adequately functional. If not, a low battery indicator 225 initiates. Otherwise, the operation proceeds to port configuration 240 to initiate loop mode in a switch case 250, which initiates self-test with a query 260 of a pass 265 with LED activation as indication such as by the diode 154.

After pass 265 or fail (not shown), the operation returns to the switch case 250 for a first test with a query 270 for either the pass 265 or fail (not shown). Then the operation proceeds to a second test with a query 280 for either pass 285 by the diode 154 or else fail (not shown), and upon return to the switch case 250 to the third test with a query 290 for either the pass 285 or fail (not shown) based on a proper voltage difference threshold not to be exceeded to satisfy requirements for the article 166. Responses to these queries 280 and 290 complete the exemplary process.

View 200 shows a logic diagram for the firmware that was developed to test the various RF items by the RFV 110. This provides the intelligence for the RFV 110 to decide whether a component article 166 passes or failures a defined test. The operator selects the test mode for the RFV to be in by selection on an external switch. The operator connects the RF component, and the RFV 110 tests and provides a pass status via an LED diode 154 or else a fail status.

The exemplary RFV 110 is designed to be a low cost and portable piece of RF test equipment that can be used to verify that RF components of a larger system are functional. This capability is critical for Forward Operating Bases (FOB's) where the military units only bring enough components to setup the required functional, and provide real-time diagnostic capability to directly identify the problem component and get the system operation as soon as possible. The RFV 110 can be used to verify any RF system that has detachable components that can be individual tested in the field.

Exemplary embodiments provide an RF transmitting and receiving device as the RFV 110 that can measure RF power and DC bias of such devices and cables as articles 166 to ensure proper operation. An exemplary prototype device was initially designed to test the components and cables of a communication system for the United States Marine Corps (USMC) called the Intelligence Broadcast Receiver (IBR) Accessories Kit.

Components of a conventional IBR kit consists of a low noise amplifier, bias tee, and RF cables of varying lengths. The IBR kit operates when the components are linked together, forming a chain for RF to propagate. The failure of any component in the chain results in failure of the entire IBR kit. In the result of a failing IBR kit, no conventional field technique, outside of selective interchange of components, to determine which component in the kit has failed. The exemplary RF validator (RFV) 110 provides an expedient pass/fail test to ensure the proper function of the individual components as articles 166.

The exemplary RFV 110 is used to verify the RF integrity and DC bias of devices or cables connected thereto. The testing components used to facilitate these requirements include an RF transmitter 120, RF receiver 140, a set 130 of voltage dividers, and a microcontroller 152. The RF transmitter 120 generates a consistent RF tone via the source 122 to pass through connected devices. The RF receiver 140 contains an RF detector 144 that measures the RF power received from the tested device 166. Voltage dividers 132 and 134 in the set 130 limit the DC bias voltage sensed by the microcontroller 152, which analyzes the RF power and applied DC bias at its input ports 162 and 164.

The hardware also contains RF switches 126 and 142, enabling the RF signal to bypass the ports 162 and 164 to enable a built-in self-test. RF integrity is verified by generating a consistent RF tone from the source 122 and measuring the change in power of the tone after propagating through a connected article 166, or through the RFV 110 itself if self-test is desired. The microcontroller 152 determines whether the RF power received by the RF detector 144 is within the expected parameters of the device or cable being tested as the article 166. In the presence of DC bias at the input or output ports 162 and 164 of the RFV 110, one of the voltage dividers 132 and 134 reduces the voltage to logic level for the microcontroller 152 to sense. This confirms the applied DC bias is within the expected parameters of the article 166 being tested.

Opportunities exist for exemplary embodiments in any circumstance in which RF components and cables are subject to damage and could benefit from an expedient pass/fail test that would be rapid, reliable, inexpensive and convenient. The microcontroller 152 provides flexibility to accommodate any number of commercial or military grade devices, systems, or cable lengths by allowing easy configuration of RF parameters to be preprogrammed, rendering exemplary embodiments applicable to various industries.

This inventive concept became a solution to a problem that operators of the IBR kit experienced. An expeditious technique could check components of their kit before setting up equipment, or to identify which component failed in cases of troubleshooting. The advantage of providing component testing capabilities to the IBR kit by exemplary embodiments is that it potentially minimizes troubleshooting time. As alternatives, RF cable or network analyzers may serve as a substitute to replace some functions of the RFV 110, however absent the degree of scale and customization the RFV 110 can achieve.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A radio frequency (RF) validator instrument for testing functionality of a signal device having first and second terminals, said instrument comprising:
    an RF transmitter for producing an emission signal processed as a test signal;
    an in-port and an out-port respectively connecting to said second and first terminals;
    a direct current (DC) bias detector comprising first and second voltage dividers respectively connecting to said out-port and the second terminal, said first voltage divider receiving said test signal from said out-port and providing a first bias signal, the signal device producing a response signal to said in-port and to a second voltage divider that provides a second bias signal, said bias detector combining said first and second bias signals as a combination bias signal;

an RF receiver for receiving said response signal from said in-port and said combination bias signal for producing a detection signal; and an RF verifier for comparing said detection and combination bias signals to determine whether their difference is within an established threshold of the signal device, which satisfies the functionality.

2. The instrument according to claim 1, wherein said DC bias detector produces said first and second bias signals into corresponding voltages.

3. The instrument according to claim 1, wherein said verifier further includes:

an electronic controller for receiving said combination bias signal and said detection signal for comparison to determine whether their difference conforms within a threshold as satisfaction, and a pass illumination indicator that activates in response to said satisfaction.

4. The instrument according to claim 3, wherein said controller is one of a general purpose processor, an application specific integrated circuit (ASIC), a field programmable gate array (FPGA), and digital signal processor (DSP).

5. The instrument according to claim 3, wherein said indicator is a light-emitting diode (LED).

6. The instrument according to claim 1, wherein said RF transmitter further includes:

an RF source for producing an RF emission signal, an attenuator for amplifying said RF emission signal and submitting an RF amplification signal, and an RF switch for receiving and selectively transmitting said RF amplification signal as said test signal.

7. The instrument according to claim 1, wherein said RF receiver further includes:

an RF switch for receiving said test signal and forwarding a switch signal; and an RF detector for receiving said switch signal and submitting said detection signal.

\* \* \* \* \*

UNITED STATES PATENT AND TRADEMARK OFFICE
CERTIFICATE OF CORRECTION

| | | |
|---|---|---|
| PATENT NO. | : 12,425,112 B2 | Page 1 of 1 |
| APPLICATION NO. | : 18/200815 | |
| DATED | : September 23, 2025 | |
| INVENTOR(S) | : Rand C. Chandler et al. | |

It is certified that error appears in the above-identified patent and that said Letters Patent is hereby corrected as shown below:

On the Title Page

For (71) Applicants: please replace "Aiden J. Cowhig, Arlington, VA (US)," with --Aidan J. Cowhig, Arlington, VA (US),--.

For (72) Inventors: please replace "Aiden J. Cowhig, Arlington, VA (US)," with --Aidan J. Cowhig, Arlington, VA (US),--.

Signed and Sealed this
Twenty-first Day of October, 2025

John A. Squires
*Director of the United States Patent and Trademark Office*